United States Patent [19]

Baker

[11] Patent Number: 5,681,194

[45] Date of Patent: Oct. 28, 1997

[54] RECYCLED FIBRE REINFORCED RESIN CONTAINING PRODUCT

[76] Inventor: Richard Baker, 27 Bristol Sands Cres., Stouffville, Ontario, Canada, L4A 7X4

[21] Appl. No.: 354,247

[22] Filed: Dec. 12, 1994

Related U.S. Application Data

[63] Continuation-in-part of Ser. No. 895,616, Jun. 9, 1992, abandoned.

[51] Int. Cl.$^6$ .................................................. B32B 5/16
[52] U.S. Cl. .................... 442/394; 442/393; 428/903.3
[58] Field of Search .................... 428/903.3; 442/393, 442/394

[56] References Cited

U.S. PATENT DOCUMENTS

| | | | |
|---|---|---|---|
| 3,995,819 | 12/1976 | Kunogi et al. | 241/58 |
| 4,123,584 | 10/1978 | Brewton | 428/379 |
| 4,180,607 | 12/1979 | Sasaki et al. | 528/112 |
| 4,983,549 | 1/1991 | Greve | 501/27 |
| 5,075,057 | 12/1991 | Hoedl | 264/115 |
| 5,082,878 | 1/1992 | Bansleben et al. | 523/203 |

FOREIGN PATENT DOCUMENTS

| | | |
|---|---|---|
| 0358178A1 | 3/1990 | European Pat. Off. . |
| 0407925A2 | 1/1991 | European Pat. Off. . |
| 4139257 | 6/1993 | Germany . |

*Primary Examiner*—Christopher Raimund

[57] ABSTRACT

A recycled fiber reinforced resin containing product comprising a quantity of fiber reinforced resin pieces mixed together with a quantity of granular aggregate material, and a binder, in which the fiber reinforced resin pieces and the granular aggregate are intermixed with and embedded in the binder, the binder being selected from materials having an initially plastic state, in which fiber reinforced resin pieces and granular aggregate may be intermixed, and the binder materials being thereafter hardenable at room temperature into a hard mass without the application of heat, and a method of manufacturing such a recycled fiber reinforced resin containing product, and apparatus for the manufacture of such a recycled fiber reinforced resin containing product.

9 Claims, 5 Drawing Sheets

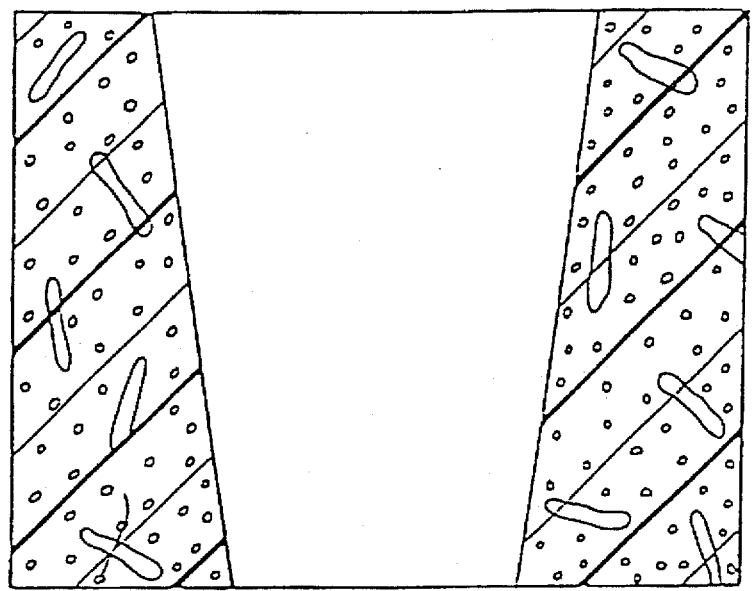
M  B  FIG. 2
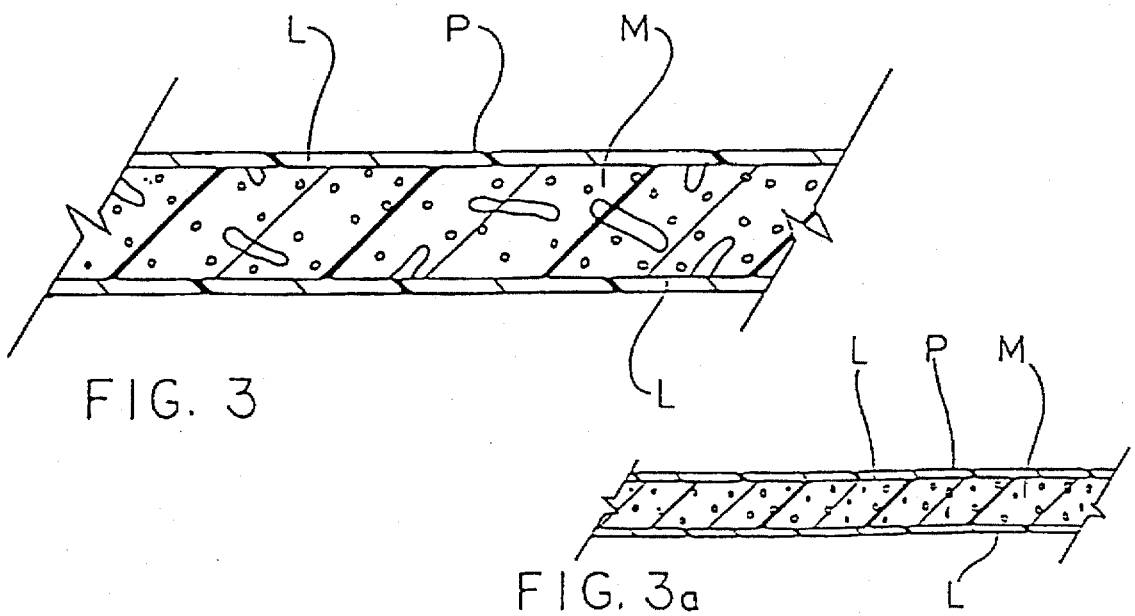
FIG. 3
FIG. 3a

RECYCLED FIBRE REINFORCED RESIN CONTAINING PRODUCT

This application is a Continuation-In-Part of application Ser. No. 07,895,616, filed Jun. 9, 1992 entitled Recycled Fiber Reinforced Resin Containing Product And Method And Apparatus, Inventor: Richard Baker, now abandoned.

FIELD OF THE INVENTION

The invention relates to a recycled fiber reinforced resin containing product, in particular to a product containing a substantial proportion of recycled waste fiber reinforced resin product, and to a method of forming such products, and to apparatus for forming such products.

BACKGROUND OF THE INVENTION

Glass fiber reinforced resin products are in wide use for many purposes. This form of synthetic plastic material is attractive from many points of view. It may be fabricated into attractive intricate shapes. It may be moulded in very large shapes. It has great inherent strength and durability, and is weather resistant. The uses of this type of fiber reinforced resin (FRP) products are too numerous to even mention. It is however well known that like many other manufacturing processes, it produces a significant degree of waste material, or reject articles. Waste material is produced in almost every case, by marginal portions or fringes of the material which extend around the edges of the mould and must be trimmed away. Some moulded articles are imperfect and must be rejected. Articles even of FRP, eventually are likely to wear out or become discarded.

In addition to all of these problems, the manufacture of the resins and of the glass fiber also results in wastage. The resins must be formulated strictly in accordance with specified formulations. Any quantities of resins which are "off spec" must be rejected as being unsaleable. The same is also true of the glass fibers themselves.

The very properties which make FRP an attractive material, also make it a serious problem from the point of view of disposal in an economical and above all ecologically satisfactory manner. Since the FRP material is highly resistant to weathering, if any quantities of it are placed in a dump it will remain there for many years, and will be virtually indestructible. Another of the properties of the FRP materials is their resistance to breaking and crushing. As a result, the disposal of waste FRP products presents a handling problem in that it is difficult if not impossible to crush them and compact them to a degree satisfactory for the waste disposal industry.

As a result of all of these problems, it is not unusual to find that the cost of disposal of waste FRP products is a significant item in the overall operating cost of the plant, both of the manufacturer of the base product and also the fabricators of the material.

At present there exists no market for waste FRP materials. Considerable experimentation has been conducted in certain countries in simply attempting to break down the material into some form of coarse, granular particles, in which form the waste FRP it can be easily handled and disposed of. However, in spite of very heavy expenditures, these experiments have not yet proven successful as a satisfactory method of disposing of such waste FRP materials.

It is of course apparent that even if such a line of experiments were successful all that would happen would be that the FRP waste materials would be dumped into the environment in a more concentrated form than is presently the case. So far as is known, no data exists as to the possible long term effects of the dumping of substantial quantities of highly concentrated FRP products, in this form, into the environment.

Other waste products are available which, while being less damaging to the environment, are nonetheless a problem from the aspect of simple disposal. Such products include waste materials such as concrete, glass, crushed stone, sand blasting materials, foundry slag, and the like.

Clearly, a more attractive solution to the problem would be to dispose of the waste FRP, and other waste products, in such a way that they were not simply dumped into the environment, but would be recycled into a useful material and in some way be reused on a more or less permanent basis.

Proposals have been made to grind FRP waste materials into a fine powder to be used as a filler in conventional sheet moulding compound (SMC). This fine powder was then intended to be mixed in the conventional manner with new resin and sandwiched between sheets of new reinforcing cloth to make SMC. This material remained in a semi-cured soft state until used. In use it was placed in a mould and subjected to high heat and pressure to mould thin sheet articles and to cure the partly cured resin.

This proposal required large proportions of fresh resins. Also the waste FRP powder contained catalysts. Some resins also the waste FRP powder contained catalysts. Some of these catalysts could react with the fresh resin and cause premature hardening of the material while stored in the semi-cured state. Consequently the shelf life of such sheet moulding compounds was uncertain and the results obtained in the end product were not reliable.

BRIEF SUMMARY OF THE INVENTION

The present invention seeks to provide a new product for using recycled FRP pieces which uses relatively large amounts of FRP and relatively small amount of resin.

The invention provides a solution to the foregoing problems, by the provision of a dry pre-mix of a recycled fiber reinforced resin containing product comprising a quantity of fiber reinforced resin materials of random shape and dimensions, mixed together with a quantity of granular aggregate material, which is combined with a flowable binder, in which said fiber reinforced resin and said aggregate are intermixed, said binder being selected from materials having an initially plastic state, and said binder materials being thereafter hardenable at room temperatures into a hard mass, without heating. The binder materials are not more than about 25%, and preferably 20% or less, by volume of the recycled fiber reinforced resin and aggregate materials.

The invention further comprises such a recycled fiber reinforced resin containing product, wherein the fiber reinforced resin materials include flakes formed as shredded portions of larger discarded fiber reinforced resin containing products, having a length and breadth of between about 2 to 8 inches, and having a thickness equal to about the thickness of said discarded fiber reinforced resin containing product.

The invention further comprises such a recycled fiber reinforced resin containing product and wherein said fiber reinforced resin material include a quantity of fiber reinforced resin particles having a particle size of between about ⅛ of an inch and ½ of an inch.

The invention further comprises such a recycled fiber reinforced resin containing product wherein said aggregate materials include coarse aggregate granules having a particle size of between about ⅛ inch and ½ inch, and fine aggregate granules having a particle size of ⅟₃₂ inch or less, and are present in the dry mixture in a quantity in excess by volume of that of said fiber reinforced resin materials.

The invention further comprises apparatus for manufacturing a recycled fiber reinforced resin containing product and comprising shredder means operable to shred fiber reinforced resin pieces into a random sized flakes of fiber reinforced resin material, aggregate supply means for supplying granular aggregate material, dry mixer means for receiving said fiber reinforced resin flakes and said granular aggregate material and intermixing the same, binder supply means for supplying a binder in a plastic state, binder mixer means for receiving said fiber reinforced resin flakes and said aggregate and said binder material in a plastic state, and operable to intermix the same, and, ejection means for ejecting said material while in a plastic state.

The invention further comprises apparatus for manufacturing such a recycled fiber reinforced resin containing product and further including granulating means for receiving said fiber reinforced resin flakes, and further reducing same to fiber reinforced resin particles having an average size of between about ⅛ inch and ½ inch.

The invention further comprises such apparatus, and wherein said dry mixer means includes a dry mixer cheer having an upstream and downstream end, means for admitting said fiber reinforced resin pieces at said upstream end, and, aggregate conveyor means receiving aggregate from said aggregate supply means, and progressively metering same into said dry mixing chamber for mixing with said fiber reinforced resin pieces.

The invention further comprises such an apparatus and wherein said binder supply means comprising first component container means, second component container means, component mixing means for receiving such first and second components, and mixing them in predetermined quantities, whereby to maintain a preset predetermined ratio, and means for supplying said two components to said binder mixer means.

The invention further comprises a premixed dry materials for combination with a binder to form a compressible thin core layer for a panel. The premixed material comprises fiber reinforced resin scrap material ground into particles having dimension of between about ⅛ and ½ inch, course aggregate materials having dimension of between ⅛ and ½ inch, and fine aggregate material having dimension of about ⅟₃₂ inch or less, in the following proportion, by volume: fiber reinforced resin scape material of about 20% to about 40%, coarse aggregate material about 10% to about 30%, and fine aggregate material of about 20% to about 40%, whereby to provide a dry premix adapted to be subsequently mixed with a flowable binder in proportion of dry premixed material of about 75% to about 90% and binder of not more than about 25% and preferably 20% or less.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 2 is a section of a typical product illustrating one mode of usage for certain articles, which are made of the material produced in accordance with the method of FIG. 1;

FIG. 3 is a schematic sectional illustration of a laminated product formulated in accordance with the invention illustrated in FIG. 1;

FIG. 3a is a schematic sectional illustration of a laminated product formulated in accordance with Example 4;

DESCRIPTION OF A SPECIFIC EMBODIMENT

As already mentioned above, one of the principle features of the method in accordance with the invention, is its ability to employ waste materials, in particular waste FRP materials, which are either waste, or rejects, or are surplus or discarded materials, for whatever reason. Other waste materials are also of utility in the invention, as described below.

All of this is well known and is merely repeated here simply for the sake of illustration. The length of the FRP reinforcing fibers is one of the factors contributing to the strength of the final article. In the FRP forming art, some products are made of what are known as glass fiber rovings. These are simple bundles of glass fibers, which are arranged throughout the laminate layer, usually along more or less parallel axes. Other articles use glass fibers woven into a loose cloth. These articles possess considerable lengths of glass fibers, which extend at right angles. These glass fiber mat materials are more expensive, and are used only where greater expense is justified.

FRP products are produced, where the glass fibers are simply chopped up into relatively short lengths, and applied to or mixed with the wet resin, as a mat. These products are somewhat lower in cost.

In many cases, the practice is to use a combination of different forms of fiber reinforced resin materials in a single article in different layers or laminations. Such articles are usually manufactured by applying them to a mould, after first having applied to the surface of the mould a layer of so called "gelcoat", which is another form of synthetic material providing an exterior finish. Once such articles have cured, there is usually some surplus marginal portion of the article around the edge of the mould, which must be trimmed off in a finishing operation. These trimmed portions are then simply waste.

An article once out of the mould may be to be defective for some reason, and is rejected. FRP articles may become surplus. Old items are discarded either being unsaleable inventory of old products, or for example being products which are no longer required by their customers. In other cases FRP products may become damaged in use. Repairing FRP is expensive and not always satisfactory. There is a high rate of discard of damaged articles. This is true both in automotive and marine FRP products.

Manufacturers of basic resins and fibers not infrequently produce product which are off specifications, and is unsaleable. These products also are a waste.

Figure 1:
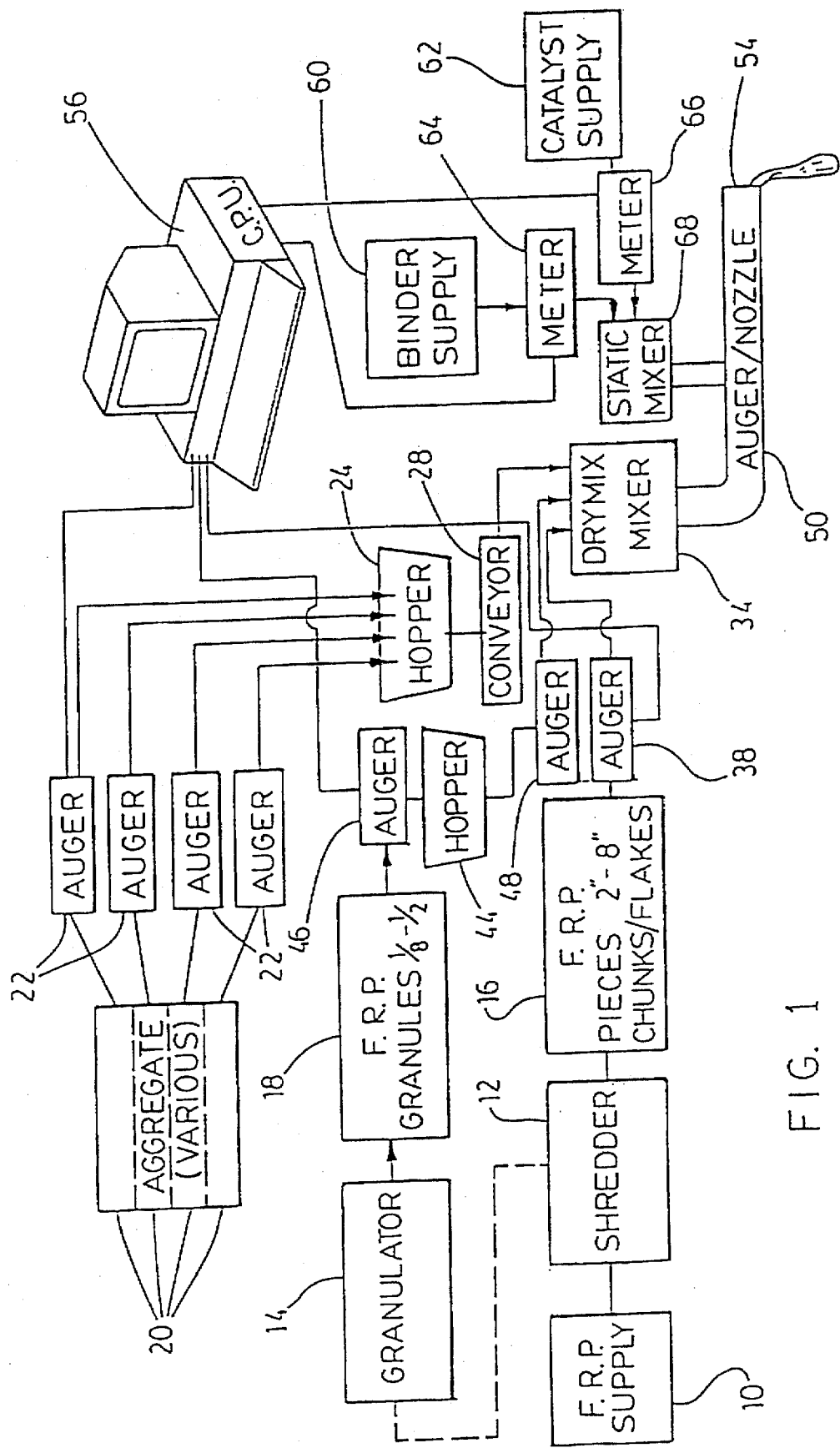
FIG. 1 is a general schematic block diagram illustrating the various stages in the method in accordance with the invention.

Referring now to FIG. 1, this illustrates the schematic form the general steps of the method in accordance with the invention.

In FIG. 1, a FRP supply is indicated generally as 10 which can represent any source of waste FRP material such as is described above. A primary shredder is indicated generally as 12. The shredder is of a type known in the art for example in the automotive disposal art, and is capable of accepting very large articles, and reducing them to chunks or pieces of in the region of for example 2 to 4 to 8 inches in length and width. Such shredder machinery is available from a variety of manufacturers. One form particularly suitable for the practice of the invention is manufactured by SHRED-TECH of Cambridge, Ontario, Canada. It will be appreciated that the waste FRP products to which the invention relates may be relatively small offcuts cut off around the edge of a moulded product, which may be only a few inches wide and a few feet long. On the other hand, the products may be entire articles, which have for some reason become rejects. Such articles may be many feet in length and breadth.

In accordance with the invention, the waste FRP material to be recycled, is first reduced to flakes of a size of somewhere about 2 to 3 in breadth, and 6 to 8 inches in length. Usually the thickness of such FRP products is not a significant factor, since they are usually made relatively thin, to take advantages of the properties of the FRP materials themselves. The shredded flakes or chunks will usually therefore have the same thickness as the original article.

Various forms of equipment already exist on the market for breaking up and shredding large articles. Machines already exist for example which will take an entire automobile, from which major components such as the engine, transmission and the like have been removed, and shred the entire automobile into relatively small fragments within the matter of a minute or so. Equipment of this type will also handle waste FRP products of a wide variety of sizes, and essentially tear the waste products apart, and shred them down to a size in which they consist essentially of flakes or chunks of material of about 2 to 3 inches in breadth, and 6 to 8 inches in length.

It will of course be appreciated that these dimensions are not specified here with any degree of precision, these being merely given by way of example for the purposes of illustration.

It will however be understood by those persons skilled in the art that flakes of FRP products of this size still have considerable inherent strength, and if they can be incorporated into products, these strengths may be utilized once more.

Such flakes may be used in many products as described below. In certain other products however it is desirable to reduce the FRP flakes down to a coarse granular product. This is carried out in a grinder 14.

It will be understood by those persons skilled in the art that such grinder equipment exists which can take such flakes of FRP products, and reduce them to what is essentially a coarse, granular form of a material, in which particles may vary in size from about ⅛ of an inch or so to about ½ of an inch. The reduction of flakes of FRP material to this size can be achieved today using existing equipment.

It will be recognized by those skilled in the art that FRP particles reduced down to below 1 inch in size by what is essentially a coarse grinding process, will have less of the valuable original properties of FRP remaining. Consequently, if they are incorporated, alone, into an end product, they will not afford much strength to the product.

This however is contemplated in one example of the invention, described below.

Thus the invention is directed to working with FRP waste materials which have been shredded down to pieces or flakes in the region of between 2 to 3 inches in breadth, and 6 to 8 inches in length and breadth, or considerably greater dimensions in some cases. And also FRP waste materials which have been subjected to further grinding or reduction of the some of the flakes down to the smaller particle size described above, ie. between about ⅛ and ½ inch, for certain products, for use with, or without such flakes where suitable to the end product.

Such FRP flakes have the advantage that the process of tearing the original FRP articles apart to reduce them to this size is not such as to produce a rapid destruction of the shredding machinery. In addition, the flakes which result from this shredding stage still retain substantial properties for which FRP products are justly desirable.

The use of particles which have been produced by a further grinding of the flakes down to the smaller particle size described, is advantageous in some circumstances as described below, and enables the waste FRP materials to be used for their bulk, in the smaller particle sizes, as fillers. In this way, the greatest use may be made of the waste FRP materials, so that this relatively inexpensive waste raw material may be reused in an advantageous manner to make a variety of useful end products in the manner described below, and to avoid allowing such waste materials to be simply dumped into the environment.

The specific design of the apparatus in which the shredding stage, and the grinding stage if required, is carried on does not form part of the invention. Such equipment is available from others in a variety of forms as described above. The invention is not limited or restricted in any way to any one form of shredding and/or grinding equipment.

It will now be understood that the invention is applicable both to the use of FRP products which have been shredded or separated down to flakes of the type described and also to such flakes which are ground down to a coarse particulate material. The shredding procedure is usually the first step in the processing of the FRP waste products in accordance with most embodiments of the invention to provide a useful recycled end product in the manner described below.

From the shredder 12, shredded FRP pieces may, in this embodiment, be passed typically in batches, for storage in a container (or containers) indicated generally as 16. Batch storage of such materials is particularly suitable for practising the invention. In this way it is possible to operate the shredder to shred large quantities of FRP articles, and then to simply store such quantities, so that they are available when required for further processing in accordance with the invention.

A mobile shredder and in some cases a mobile grinder as well can travel from one site to another to treat waste FRP "on site", and reduce it down to shredded pieces (or granules). The material will then be ready for transportation in an economical manner. However the invention is equally applicable to continuous operation of the shredder in conjunction with the remaining steps yet to be described.

FIG. 1 thus illustrates a FRP granulator or grinder 14 connected, by a conveyor or the like (not shown), for receiving shredded material from, for example, shredder 12 (or containers 16). FRP particles will typically be conveyed to a particle storage container (or containers) 18.

Also illustrated in FIG. 1, are a plurality of granular aggregate containers 20, the purposes of which will be described below.

The aggregate containers will supply a variety of granular aggregate materials for mixture in accordance with the invention with the FRP materials. Such aggregate materials may, as will be described below, be of a wide variety of types. For present purposes, some of the aggregate materials are simply coarse granules of waste materials, such as glass products, such as have been disposed of in domestic and industrial waste recycling programs. Large quantities of such waste recycled glass materials exist, for which little or no use may be available, depending upon the type of glass, and the degree of contamination. However such materials are easily broken down into granules. Typically such aggregates will have a dimension in the region of between for example one eighth and one half of an inch. However, the invention is not restricted to aggregates of glass material, nor to aggregates of this size, but is of much wider application, as will be apparent from the following description. Finer aggregate granules, down to 1/32 inch or less are used in combination with the coarse aggregate, as will appear from the examples herein.

In accordance with the invention, the various aggregate materials from containers 20 are supplied by means of metering auger conveyors 22 to the hopper 24 having partitions 26.

Hopper 24 supplies the aggregate materials, usually a mix of such aggregate materials, to a belt conveyor 28 driven motor 29. In this embodiment hopper 24 has metering slides 30 (FIG. 4) to regulate the proportions of different aggregates in the mix. However, the augers are operated by motors 32 and they can be speed controlled so that they themselves meter the quantities of the aggregates reaching conveyor 28. In this case the slides 30 may not be necessary.

Belt conveyor 28 carries the mix of aggregates to a dry mixer 34.

At this stage the FRP flakes are supplied from container 16 by a metering auger 38 to an upper region of dry mixer 34. Motor 40 drives auger 38, and meters the quantity supplied.

FRP particles are supplied from a container 18 to a hopper 44. Motor 45 drives an auger 46 for this purpose, and will also be speed controllable.

A transverse FRP granule auger 48 may supply F.R.P. particles from hopper 44 to a lower region of dry mixer 34 before the introduction of the binder.(in some cases)

Thus all of the aggregates, the FRP flakes (if used) and the FRP particles (if used) are mixed together in the dry mixer 34.

The dry mixer 34 is essentially a hollow cheer in which all the raw materials are simply tumbled and loosely mixed (by mechanical means not shown) in the dry state. This combined dry mix may be referred to as the pre-mix, ready for later combination with a binder.

Various binder materials will be described below of various different compositions. In a typical case, it is assumed that the binder material is a mixture of a typical resin plastic and catalyst system, of the type in use in the fabrication of FRP articles. However, as will become apparent from the following description this is not always the case, and other binder materials and systems can equally well be used with the invention in certain circumstances, with varying results on the properties of the end product. It is preferable that the binder and catalyst not be intermixed until just prior to their combination with the dry ingredients to prevent curing.

Such binder material, will progressively harden at room temperature, as it cures without the application of heat, into a solid mass.

The binder mixer is a generally transverse hollow tubular auger 50 containing an auger screw 51 driven by motor 52, and connected to the dry mixer 34 by pipe 53 in order to receive the homogeneous dry premix of FRP waste material, and aggregate so that this dry premix mixture may then be mixed with the binder material while in its plastic phase. The binder material will be in a semi fluid or flowable or plastic state, such that it may be intimately mixed with the dry premix mixture of FRP material and aggregate within the binder mixer auger 50. The resultant mixture M is extruded through an extrusion nozzle 54, still in a semi-plastic state. A computer or CPU 56 controls the apparatus.

Figure 6:
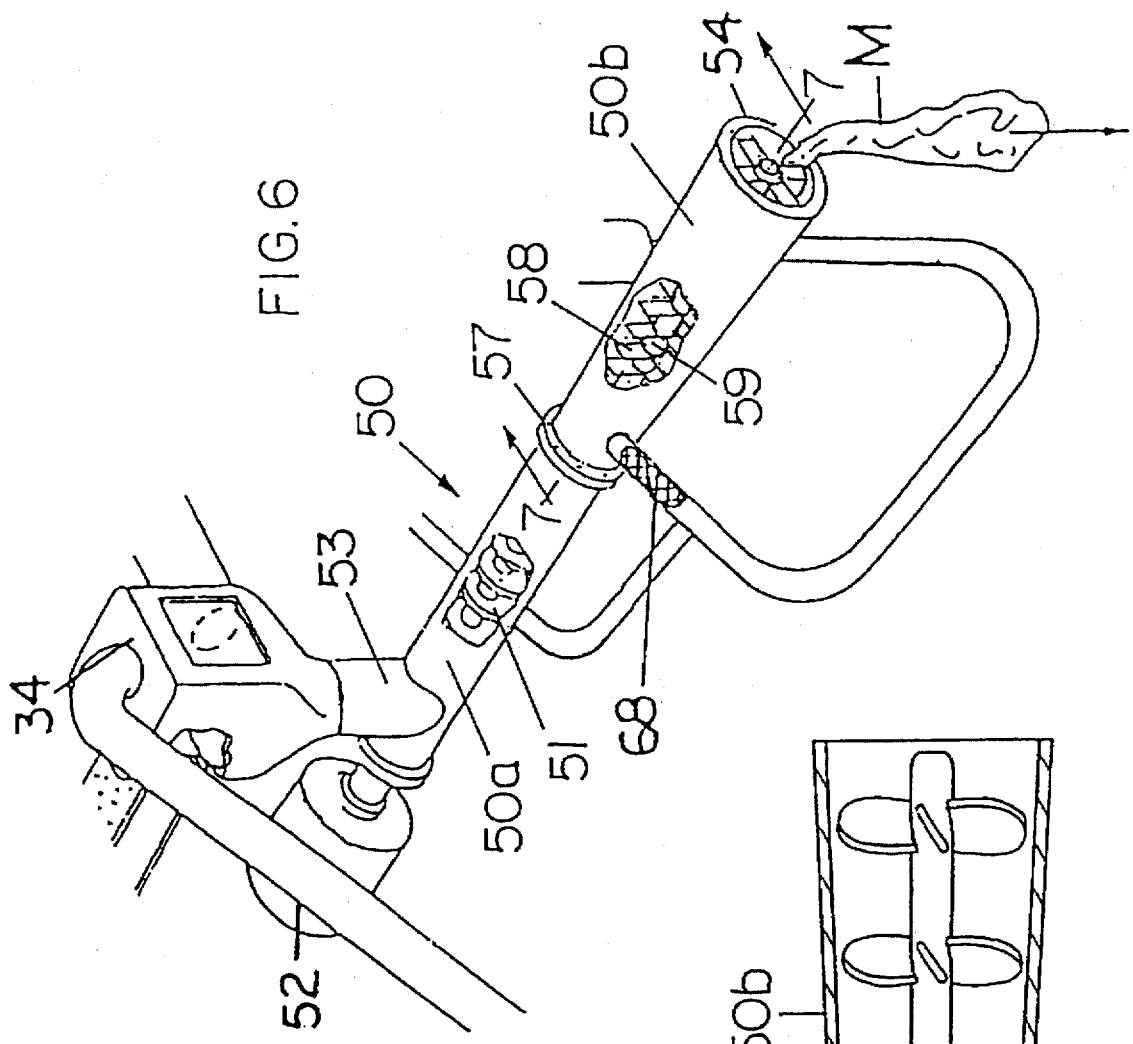
FIG. 6 is an enlarged cut away perspective of the mixing chamber.

Auger tube 50 is formed in two sections 50a and 50b (FIG. 6). Section 50a is upstream and is cylindrical. Section 50b is downstream and is flared progressively to mouth 54, at the downstream end. A union 57 joins sections 50a and 50b.

Auger screw 51 within section 50a is of regular helical screw shape. Within flared section 50b a plurality of auger drive blades 58 are secured to a shaft 59, which extends from auger screw 51.

Figure 7:
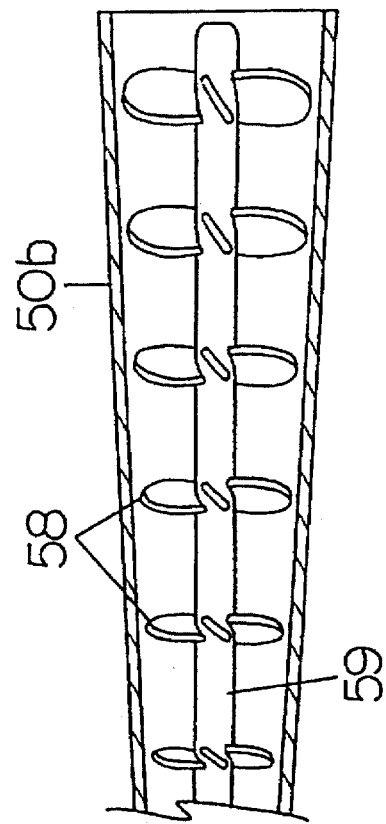
FIG. 7 is a section along 7—7 of FIG. 6.

The material M that meets progressively less resistance as it approaches mouths 54. Blades 58 are angled at progressively increasing degrees of pitch (FIG. 7), so as to accelerate material M as it passes along section 50b.

Figure 4:
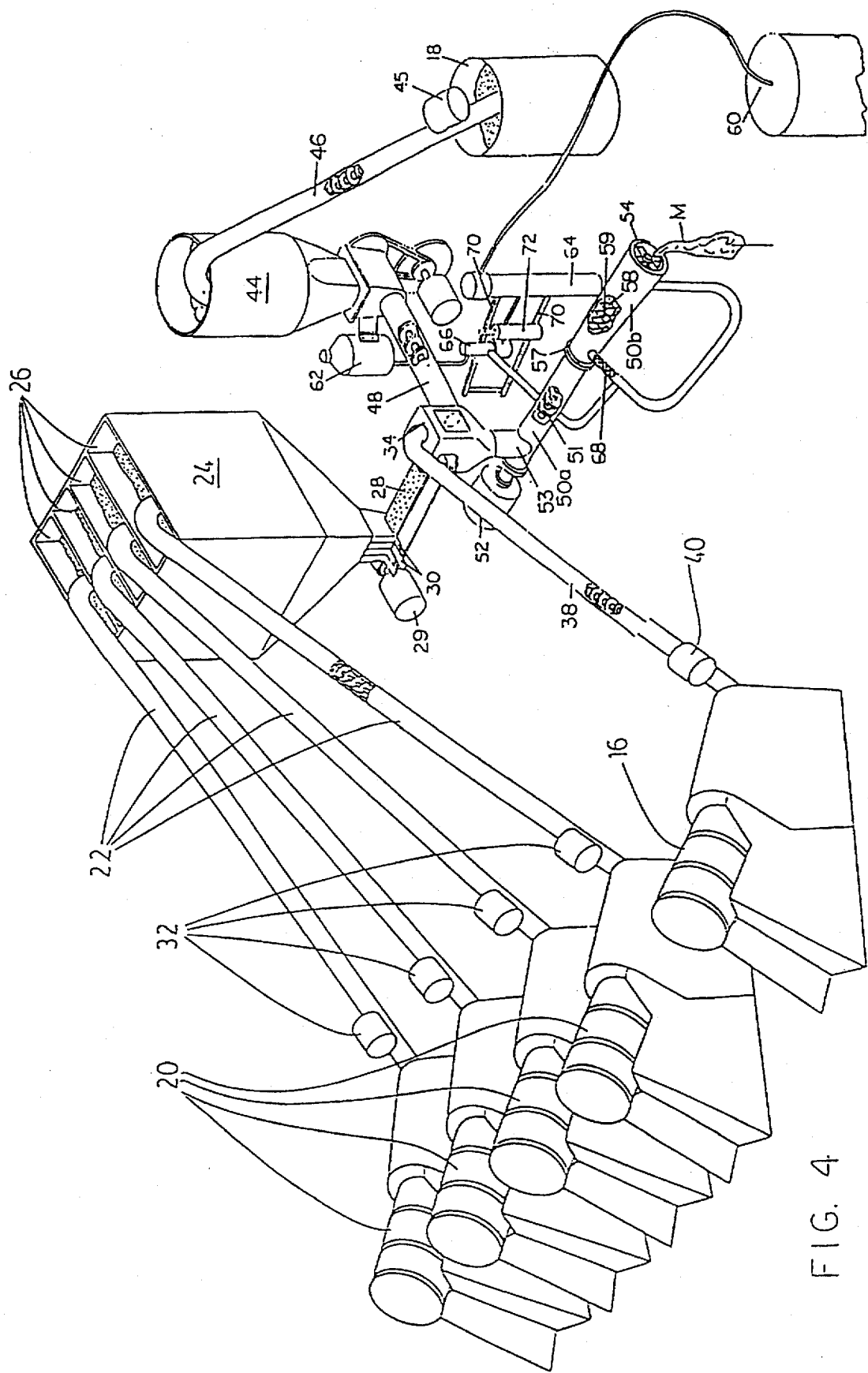
FIG. 4 is a perspective illustration in somewhat schematic form, showing an apparatus for carrying out the method of the invention of FIG. 1.

The semi-plastic material M exiting from the nozzle 54 in FIG. 4, comprises the basic raw material product manufactured in the accordance with the invention.

The binder cures and hardens at room temperature without heating and the entire mixture will solidify into a hard homogenous mass.

Suitable sensing devices will be located where required, being connected to a central CPU station 56, where the various different stages of the process may be controlled and varied as required.

As mentioned above, various forms of binder materials may be employed. One particularly useful form of binder material will itself be a two component system consisting of a polyester resin material and a catalyst, similar to the two component systems used in the FRP art. In this case, such a binder system would be supplied essentially in the manner illustrated in FIG. 4. In FIG. 4 there is illustrated a resin container 60, and a catalyst container 62, connected to suitable metering pumps 64 and 66 supplied by the containers, for pumping metered quantities of resin and catalyst respectively to the static resin mixer 68. In this way, it is possible to maintain an accurate and precise control over proportions of the resin\catalyst system, so as to ensure consistent and repeatable specifications from one batch of product to another.

Pumps 64 and 66 are connected between upper and lower levers 70—70 operated by cylinder 72. Precisely metered proportions of resin and catalyst can be pumped in this way.

One of the advantages in using a resin\catalyst system is the fact that since the invention is directed primarily to the use of waste FRP products, and not to the manufacturing of new quality products, it may be possible to use "off-specification" batches of resin or catalyst for some or even all of the resin and catalyst used, without seriously impairing the qualities of the end product.

Another of the advantages of using a resin\catalyst system as the binder material, is that generally speaking it will form an excellent bond with the flakes or pieces or particles of FRP material incorporated in the mixture. Thus the mixture can be expected to have a relatively high strength, notwithstanding that it is made up largely of waste or recycled materials with a minimum of new resin binder.

However, in accordance with a further embodiment of the invention, where for example even greater strength is required, a two component epoxy system may be employed. In this system a first component and a second component are mixed, typically being of equal proportions.

In any event, the nature of the two pumps is such that the quantities supplied can be carefully metered and regulated so as to maintain the specifications laid down by the manufacturer of the raw materials.

Aggregate filler materials of various types are well known in the FRP art, but in the majority of cases, such filler materials are relatively finely divided powders.

In accordance with the invention, the aggregate materials as defined herein are of larger particle size, than filler materials heretofore in general use in FRP products. In addition, the aggregate materials of the invention may comprise a wide variety of materials. Preferably, in accordance with the invention, such materials will be selected from one or more of a variety of waste materials. Such materials may include sand blasting aggregates, ground glass, crushed stone aggregates, and waste building materials such as crushed brick, and crushed concrete and cement and mortar materials, and crushed foundry slag. This list is however merely representative of typical waste material, and is without limitation and is not intended to be an exhaustive list. In accordance with the invention some of the granular aggregate materials should have a size which is relatively substantial and coarse, that is to say somewhere between 1/8th of an inch and about 1/2 of an inch. Finer aggregates such as sand blasting material foundry slag and the like are also incorporated, having a smaller granular size, down to 1/32 inch or less. The dimensions should be by reference typically to a screen size, so that in processing such aggregates, they will be crushed and/or coarsely ground down to the appropriate particle size, to pass a screen of the appropriate dimensions.

Preferably both coarse and fine aggregate materials are used, as will appear from the following examples.

The potlife of the combined mixture which is at room temperature will depend largely upon the nature of the binder material, and may vary from an hour or two, to upwards of 24 hours or so. It will thus be appreciated that the material dispensed from the nozzle or mouth 54 may be applied in many different ways and for many different uses and applications.

For example, the material from the nozzle may simply be loaded into vehicles, somewhat like concrete transporting vehicles, and transported to a site. At a site it may be used for laying a floor, or for laying footings for a building. In this type of application the only form work required would be similar to that used in connection with concrete forming. Depending upon the nature of the binder material used, some form of release agent may have to be applied to the surface of the form work, so as to ensure that the form work may readily be removed for curing or in some cases the form work may simply be left in place.

Other methods of usage will be described below.

It will also be appreciated that the invention is not restricted solely to use with two component systems, as the binder material.

For example, a cement type product, modified to give certain specific properties, may also be used. In this case, a modified method would be used, in which the binder supply system would comprise a container, typically for containing modified cement powder in dry form, and a cement/water mixer connected to receive the powdered cement type material from the container.

In accordance with this method, the FRP flakes, with or without the admixture of a proportion of FRP particles, and granular aggregates would be dry mixed, as before, and the mixture of FRP materials and aggregates would then be mixed with the cement binder in a flowable plastic phase, to produce the end mixture M, being extruded from the nozzle or mouth 54.

Products produced in accordance with this method might have properties producing a somewhat lower strength for some purposes than products produced in accordance with the methods using two-component resin or epoxy systems described above. Such products might be entirely adequate however for many purposes, as a replacement for concrete. Products used in this way would have advantages over concrete in that they would essentially provide a permanent disposal of otherwise potentially harmful waste products such as FRP, ground glass and the like, and would avoid the filling of landfill sites with such harmful products. At the same time, cement binder products of this type if used in place of concrete would reduce the consumption of stone aggregates, thereby reducing the damage done to the ecology resulting from the operation of gravel pits and the like. Thus, while the cost of such cement binder type products might not be substantially less than, or might even be somewhat more than the cost of conventional concrete, the overall cost/benefit resulting from the use of such products might make them an acceptable alternative.

The recycled fiber reinforced resin containing product comprises about 20% to about 40% by volume of FRP waste material, about 40% to about 70% by volume of aggregate material, and a binder of not more than about 25% by volume and preferably 20% or less.

Having described the method and certain alternatives, it is appropriate to describe some examples of the invention.

| Table of Raw Materials | | |
|---|---|---|
| Binder Supply | Recycled Products | Fillers and Additives |
| Polyester Resin | FRP shredded scrap 2" × 8" chunks/flakes | Alumina-trihydrate |
| Polyester Resin | | |
| Epoxy Resin | FRP shredded scrap 1/8" to 1/2" particles | Calcium Carbonate |
| Acrylic Modified Polyester Resin | Crushed Bottle scrap Approx. 3/16" granules | Antimony Trioxide |
| Non-combustible cement products | Iron Ore Slag 1/32", 1/16", 1/8" granules | Silica Flour |
| Gypsum Plaster Products | Recycled Crushed Concrete 1/2" or less granules | Recycled Trimming Dust, Grinding Dust, Fines (Removed from shredding operation) |
| | Sand Blasting Silica waste 1/32" or less granules | |
| | Crushed Bricks 3/16" or less granules | |

Note: In the following Examples, all percentages are volume measurements. Catalysts would be included where required.

EXAMPLE #1

General Purpose

| | |
|---|---|
| 2" × 8" (typical) FRP Flakes Corase Aggregate Granules | 15% |

-continued

| | | |
|---|---|---|
| Crushed Bottle Glass | | 20% |
| Fine Aggregate Granules | | |
| Iron Ore Slag | | 20% |
| FRP Particles | | 30% |
| General Purpose Polyester Resin | | 15% |
| | Total: | 100% |

Produces a High Density Concrete-Like Casting Material

End Products planters waste containers recycling bins lamp poles patio slabs man-hole covers curb stones railway ties non fire-resistant building products Features High Compressive Strength High Recycled Content High Production Output (up to 300 pounds per minute)

In order to achieve low resin percentages the production method requires vibration or pressurizing in order to densify the material and remove air voids. Although this is considered to be a general purpose material, it has a high waste content, and therefore a low cost. Production can be increased by increasing the resin percentage, thereby making the matrix pourable. This will reduce the strength, somewhat, as well as increasing raw material costs.

EXAMPLE #2

Building Products

| | | |
|---|---|---|
| FRP Particles | | 25% |
| Coarse Aggregate Granules | | |
| Crushed Bottle Glass | | 15% |
| Fine Aggregate Granules | | |
| Iron Ore Slag | | 15% |
| Fine Aggregate Granules | | |
| Sandblast Sand | | 15% |
| Fine Aggregate Granules | | |
| Recycled Trimming Dust | | 10% |
| General Purpose Polyester Resin | | 20% |
| | Total: | 100% |

Produces a Core Material for Laminate Panel Construction

End Products

When sandwiched between two, thin, high strength FRP laminates, this material produces an extremely flat, strong, light weight panel, which, when combined with proprietary coating methods, may be made to reproduce a variety of natural building products:
institutional "pre-cast" panels
architectural elements (columns, cornice mouldings, cornerstones, and the like.)
retro-fitting and renovation cladding The difference between this Example and Example #1, is the exclusion of FRP flakes, in order to allow the core material to be sandwiched as thin as one quarter inch.

EXAMPLE #3

Fire-Resistant Building Products Type A

| | | |
|---|---|---|
| FRP Particles | | 25% |
| FRP Flakes | | 10% |
| Fine Aggregate Granules | | |
| Iron Ore Slag | | 10% |
| Coarse Aggregate Granules | | |
| Crushed Bottle Glass | | 15% |
| Fine Aggregate Granules | | |
| Sandblast Sand | | 10% |
| Alumina-Trihydrate | | 15% |
| Brominated Polyester Resin with | | 15% |
| Antimony Trioxide | | |
| | Total: | 100% |

End Products

This material utilizes a variety of raw material in order to produce fire-resistance. Due to the low resin percentage, the material requires vibration or pressurization in order to densify and remove air voids. It has been developed particularly for restoration of old buildings, building facades, especially highly decorative, ornamental details. Not all building codes require this fire resistant feature, and Example #1 materials can be used as a substitute.

Features flame spread less than 25 (ASTME 84 tunnel test)

smoke density less than 400 (ASTME 84 tunnel test)

high compressive strength corrosion resistance

EXAMPLE #4

Fire Resistant Building Products—Type B

30% + 15% + 15% + (FRP particles) + (Crushed bottle glass) +

(Iron Ore Slag) + 10% + 15% + 15%(Sandblast sand) + (Alumina

Trihydrate) + (Brominated Polester Resin with antimony dioxide)
Total = 100%

Produces a High Fire Resistant Core Material for use in laminate panel construction.

End Products

When sandwiched between two, thin, high strength FRP laminates (fire-retardant resins), as shown in FIG. 3a, this material produces an extremely flat, strong, light-weight panel, which when combined with proprietary coating methods, may be made to reproduce a variety of natural building products:

institutional pre-cast panels architectural elements (columns, capitals, dentils, brackets, cornerstones, etc.)

retro-fitting and renovation cladding.

This material can be laminated or cast into a solid, high-density, high-strength, concrete-like material, but it is non-porous, and non-absorbent.

Features

This material has been tested at the National Research Council fire laboratory in Ottawa, and has exceeded all expectations for fire resistance. This material is now approved for use according to the building code on buildings up to six stories high, and is considered to contribute no fuel to the flame.

EXAMPLE #5

High Strength Epoxy Bound Castings

15% + 20% + 20% + (2" × 6" *FRP* chunks) + (Crushed bottle glass) +

(Iron Ore Slag) + 30% + 15%(*FRP* particles) + (Epoxy Resin)

Total = 100%

Produces a high compression, high density material.

Features high compressive strength (up to 50,000 P.S.I.)

high resistance to thermal shock high corrosion resistance low coefficient of thermal expansion high heat-resistance End Products underground electrical boxes and housings underwater pilings chemical sluice channels and gates structural building components

EXAMPLE #6

Cement Based Castings

25% + 15% + 15% + (*FRP* chunks) + (Crushed bottle glass) +

(Sandblast sand) + 45%(Portland cement pre-mixed with water)

Total − 100%

Produces low-strength, non-combustible, reinforced concrete products.

End Products park benches patio slabs curb stones light standards

Features

Very inexpensive comparative strength to concrete high production output ease of production Some of the end uses for the material have already been outlined herein. Material may be simply deposited in any suitable type of form where laid upon the ground, to provide foundations, footings, floorings and the like in the manner of concrete. On the other hand, various forms of articles can themselves be actually fabricated out of the material M. For example building blocks, similar to cement based building blocks, can be fabricated out of the material of the invention. Usually, the material M in accordance with the invention will have a much higher compressive strength than the typical cement based material used for building blocks. Consequently it will be possible to fabricate building blocks B (FIG. 2) containing a lesser quantity of the material. This will have the effect of reducing the overall weight of a building structure made of such blocks, and also enable incorporation of greater volume of dead air spaces for insulation, and may also lead to the production of a building having a greater durability and resistance to heat transfer and the like.

Further uses of the material are for the fabrication of exterior panels P (FIG. 3) for the finishing of building exteriors. Customarily, exterior finishing panels and building structures, sometimes know as "curtain wall" construction, usually again involve the use of cement or concrete type products, formed into slabs to provide the exterior of a building.

By use of the invention FRP wastes can be used in much bigger proportions and in larger particle sizes than was possible in the past. In addition, the invention remains substantially unaffected by any residues of catalysts present in the waste materials and also unaffected by any contaminants or oxidizing agents in the other aggregate materials.

It is well know that such precast slabs have a very considerable weight, and impose a substantial load on a building structure and its fittings. In addition, the method by which they are secured to the building structure must be such as to provide for security of the attachment of the considerable weight of each panel for the entire life of the building.

In addition, the use of concrete materials for such exterior slabs sometimes imposes limitations on the surface or design which can be fabricated using such slabs, and also sometimes restricts the type of finish which can be applied to the exterior. Concrete may gradually weather and deteriorate in adverse climatic conditions In accordance with the invention, such concrete slabs or panels can be replaced by exterior building panels P fabricated out of the material M together with laminate layers L. This will enable panels to be made considerably thinner than conventional concrete panels, and further the material in itself has a lower specific gravity than concrete. Thus the overall weight of the panels will be substantially reduced. This will enable such panels to be made in larger sections, and will enable greater variation in the form of the design of the panels for buildings.

In addition, in view of the great inherent strength of the material M it becomes possible to fabricate exterior panels into more intricate shapes. In addition, in view of the very high bonding properties particularly of material M using resin based or epoxy based binder systems, it becomes possible to fabricate such panels with exterior finishes of a wide variety of different materials thereby giving architects greater freedom in the design of buildings.

All of these advantages are achieved, at a minimal cost, and in a manner which successfully solves the problem of disposing of various forms of waste material, which would otherwise have to be disposed of in other ways with destructive results on the ecology. At the same time, by the use of the recycled fiber reinforced resin containing products and recycled aggregates, and even unsaleable binder material, the burden imposed on the ecology by the production of fresh raw materials may also be substantially reduced.

Figure 5:
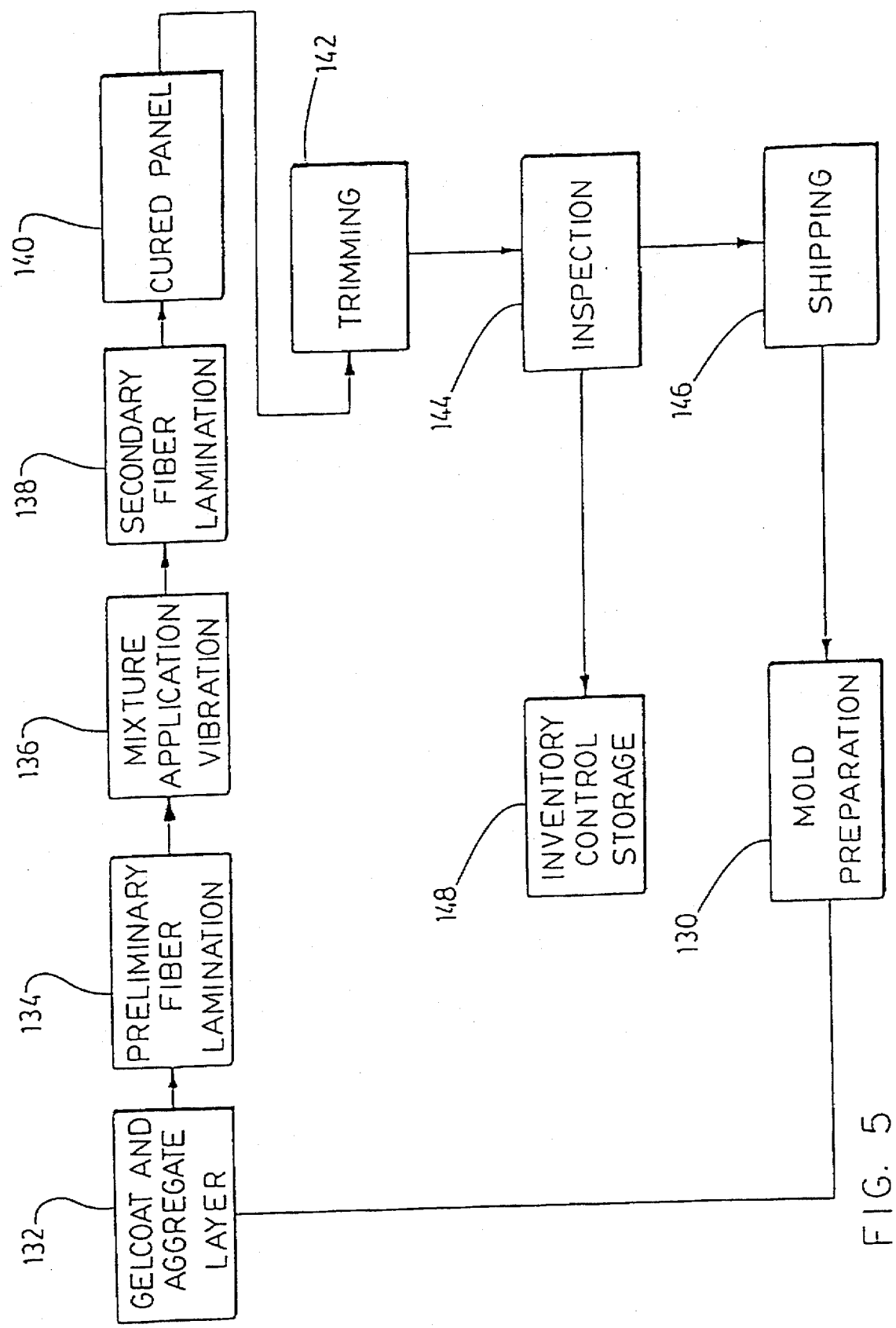
FIG. 5 is a block diagram of a typical manufacturing process using the material of the invention.

By way of example, one method by means of which the material in accordance with invention may be fabricated into a useful product, is shown in FIG. 5, in schematic form. A mould or form is indicated schematically at various stages in the production cycle. The mould may be of a shape and design to produce an exterior building panel, although this is merely by way of example. Such moulds are well known to the person skilled in the art and require no illustration.

At the position 130, the mould is subjected to cleaning and polishing. At position 132, a layer of gelcoat is applied to the surface of the mould. This gelcoat will in fact to be exterior finish of the panel. Consequently, if some finish other than a smooth typical FRP finish is required on the panel then that finish material will also be added. For example, if it is desired to produce the appearance of a fine crushed stone or aggregate appearance on the exterior of the panel, then that material would be mixed with the gelcoat and applied to the mould as a first layer in position 132.

At position 134, a lining layer of glass fiber matting and resin is laid in position over the gelcoat. The purpose of this additional layer is to provide greater strength for the exterior of the panel, and to provide a secure support for the gelcoat.

At position 136, the mixture M in accordance with the invention is deposited in the mould, on the wet glass fiber mat layer. The purpose of this is to provide a solid backing to the panel, and to give a substantial thickness for rigidity, strength, and longevity.

At position 138, it may desirable to apply an additional layer of glass fiber matting with resin, to provide a finish surface to the interior of the product. This step may not always be required, depending upon the end use for the product. At the same stage, any suitable form of anchoring devices, such as metal lugs (not shown) such as are well known in the art, may be inserted and embedded in the mixture. These lugs are placed in suitable locations where they would be required for anchoring the panel to a building fabric.

The panel is allowed to cure at position 140 at room temperature without the application of heat.

At position 142, the panel is removed and trimmed. At position 144, the finished panel is inspected and at position 148 is then made ready for shipping or storage. The empty mould is then returned to position 130 for cleaning and preparation for moulding a further panel.

Position 148 represents an information gathering stage in the process, whereby the panel may be indexed and numbered for inventory and control purposes. This may be particularly important where a variety of different panels are being fabricated for a building structure, and it is necessary to give them each a specific unique identifying numeral, so that they may be erected in the correct position.

The foregoing is a description of a preferred embodiment of the invention which is given here by way of example only. The invention which is not to be taken as limited to any of the specific features as described, but comprehends all such variations thereof as come within the scope of the appended claims.

I claim:

1. A recycled fiber reinforced resin containing product comprising;

a room temperature dry mix composition, said composition in turn comprising, a quantity of pieces of recycled fiber reinforced resin materials each of said pieces consisting of thermoset resin and fiber reinforcement bonded together, said pieces being, of random shape and dimensions, and, a quantity of coarse aggregate materials, dry-mixed together, with said pieces of recycled fiber reinforced resin materials both at room ambient temperature, and said recycled product including, a room temperature flowable non-thermoplastic binder, combined with said dry mix composition of said pieces of fiber reinforced resin materials and said aggregate materials, said binder being selected from materials having an initially plastic state at room temperatures, with which said dry mix composition of said pieces of fiber reinforced resin materials and said aggregate materials may be combined at room temperatures, and said flowable binder and said room-temperature dry mix composition of said pieces of fiber reinforced resin materials and said aggregate materials being thereafter set at room ambient temperatures into a hard mass, without input of external heating, and wherein said pieces of recycled fiber reinforced resin materials are formed as shredded portions of larger fiber reinforced resin products, said shredded portions having a length and breadth of between about 2 to 8 inches, and having a thickness equal to about the thickness of said fiber reinforced resin products, and, wherein said aggregate materials have a particle size of between about ⅛ of an inch and ½ of an inch, and are present in the dry mixture in a quantity in excess by volume than the volume of said fiber reinforced resin materials, and, wherein said aggregate materials are selected from the group of waste materials consisting of crushed stone, crushed brick, crushed mortar, crushed masonry, crushed slag, sand blasting materials and crushed glass.

2. A recycled fiber reinforced resin containing product as claimed in claim 1 wherein said fiber reinforced resin materials include particles having dimensions of between about ⅛ and ½ inch.

3. A recycled fiber reinforced resin containing product as claimed in claim 2 wherein said fiber reinforced resin materials further include fiber reinforced resin flakes having dimensions of between about 2 inches and 8 inches.

4. A recycled fiber reinforced resin containing product as claimed in claim 1 wherein said product includes aggregate materials from at least two different waste materials.

5. A recycled fiber reinforced resin containing product as claimed in claim 1 including a fiber reinforced resin laminate layer formed of reinforced fiber matting, and resin, laminated on at least one side of said product.

6. A recycled fiber reinforced resin containing product as claimed in claim 1, wherein said room temperature flowable binder materials comprise not more than about 25% by volume of said recycled fiber reinforced resin and aggregate materials.

7. A recycled fiber reinforced resin containing product as claimed in claim 1, wherein said dry mix composition is in the following proportions by volume:

pieces of recycled fiber reinforced resin materials of about 20% to about 40%, coarse aggregate materials of about 10% to about 30%, fine aggregate materials of about 20% to about 40%, whereby said dry premix composition is adapted to be subsequently mixed with said binder in proportions of dry mix composition of about 75% to about 90%, and of not more than about 25% and preferably 20% or less, of binder.

8. A recycled fiber reinforced resin containing product comprising;

a quantity of pieces of recycled fiber reinforced resin materials each of said pieces consisting of thermoset resin and fiber reinforcement bonded together, said pieces being, of random shape and having dimensions of about 2" by 8" or less;

a dry room temperature mix composition in turn comprising;

a quantity of pieces of said fiber reinforced resin materials ground into particles having dimensions of between about ⅛ and ½ inch;

a quantity of coarse aggregate materials having dimensions of between about ⅛ and ½ inch;

a quantity of fine aggregate materials having dimensions of about 1/32 inch or less, in the following proportions by volume;

fiber reinforced resin materials of about 20% to about 40%, coarse aggregate materials of about 10% to about 30%, fine aggregate materials of about 20% to about 40%, said materials having been dry mixed together at room temperature and, a room temperature flowable non-thermoplastic binder, combined with said dry mix composition of said pieces of fiber reinforced resin materials and said aggregate materials, said flowable binder being selected from materials having an initially plastic state at room temperature, said dry mix composition of said pieces of fiber reinforced resin materials and said aggregate materials being combined at room temperatures, with said flowable binder and, said room temperature composition of said pieces of fiber reinforced resin materials and said aggregate materials and said binder being thereafter set at room ambient temperatures into a hard mass, without input of external heating, wherein said dry mix composition represents about 75% to about 90% and said binder represents not more than about 25% and preferably 20% or less.

9. A recycled fiber reinforced resin containing product as claimed in claim 8 including about 10% to about 35% by volume of fiber reinforced resin particles having dimensions of between about ⅛ and ½ inch, about 10% to about 35% by volume of fiber reinforced resin flakes having dimensions of between about 2 inches and 8 inches, about 35% to about 70% by volume of aggregate material, and a binder of not more than about 25% by volume and preferably 20% or less, forming together a compressible core material adapted to be laminated to form a thin core layer for laminate panel construction.

* * * * *